United States Patent

[11] 3,576,390

[72] Inventors Donald S. Bond
Princeton, N.J.;
Alfred C. Schroeder, Southampton, Pa.;
Dalton H. Pritchard, Princeton, N.J.
[21] Appl. No. 732,949
[22] Filed May 29, 1968
[45] Patented Apr. 27, 1971
[73] Assignee RCA Corporation

[54] APPARATUS FOR GENERATING TEST SIGNALS USEFUL IN MEASURING TELEVISION TRANSMISSION PERFORMANCE WITHOUT AFFECTING RECEIVER SYNCHRONIZATION
6 Claims, 5 Drawing Figs.

[52] U.S. Cl. .......... 178/5.6
[51] Int. Cl. .......... H04n 5/00
[50] Field of Search .......... 178/5.6, 5.8, 69.5 (TV), 6 (TM)

[56] References Cited
UNITED STATES PATENTS 3,017,457 1/1962 Johnson .......... 178/5.6

*Primary Examiner*—Robert L. Richardson
*Assistant Examiner*—George G. Stellar
*Attorney*—Eugene M. Whitacre

ABSTRACT: Apparatus for generating supervisory test signals in the interval between the beginning of vertical blanking and the beginning of vertical sync in a television synchronizing waveform, so as to free for other communication purposes those portions of the waveform such test signals conventionally occupy.

INVENTORS
DONALD S. BOND
DALTON H. PRITCHARD
& ALFRED C. SCHROEDER
BY Charles Brodsky ATTORNEY INVENTORS
DONALD S. BOND
DALTON H. PRITCHARD
& ALFRED C. SCHROEDER
BY Charles Brodsky ATTORNEY

APPARATUS FOR GENERATING TEST SIGNALS USEFUL IN MEASURING TELEVISION TRANSMISSION PERFORMANCE WITHOUT AFFECTING RECEIVER SYNCHRONIZATION

This invention relates to the transmission of television synchronizing and supervisory signals, in general, and to such transmissions in a system of the type which delivers special message information to the public using existing television facilities, in particular.

A system which accomplishes such special message transmissions is disclosed in pending application, Ser. No. 551,084, filed May 18, 1966, and entitled "TELEVISION MESSAGE SYSTEM," now U.S. Pat. No. 3,493,674. One embodiment of the system therein described sequentially multiplexes message representative line scan video signals developed by an auxiliary pickup camera with primary program video signals developed by a studio pickup camera during predetermined portions of the vertical blanking interval thereof at a rate of one line scan signal per message per field of program information. More particularly, these video message signals are inserted during a time interval corresponding to that between successive horizontal synchronizing pulses within the vertical blanking interval of each program field. The composite signal is then transmitted to the home receiver in the usual manner, where apparatus is additionally included to separate the message signals from the rest of the received signal. The separated message signals may be recorded using a thin window-type cathode ray tube and an associated Electrofax printer, while the primary program signals are displayed on the kinescope of the home receiver in the normal manner. As is described in U.S. Pat. No. 3,493,674 the thin window tube displays one horizontal line of message information, which is printed on the advancing paper of the Electrofax printer. Since the kinescope of the home receiver is cut off during the vertical blanking interval, the message information included therein is not displayed and thus does not interfere with the regular program picture as seen by the viewer.

In present television practice, the synchronizing signal waveform incorporates pulse components for horizontal and vertical synchronization and blanking. The portion of the wave form during vertical blanking and synchronization ("sync") further incorporates equalizing components to minimize interaction of horizontal and vertical sync so as to insure proper interlace of successive fields in one television frame. In the standard synchronizing waveform currently in use in the United States, the vertical blanking interval occupies a time equal to approximately 20 horizontal scan lines in order to allow for deflection retrace in home receivers. It is current practice to use a certain portion of this vertical blanking interval for the insertion of test or supervisory signals for the benefit of those concerned with the generation, network transmission, and broadcasting of a television signal. Such signals may include signals used to supply reference modulation levels so that variations in light intensity of the scene viewed by a television camera will be faithfully transmitted; signals designed to check the performance of an overall transmission system or of its individual components; and cue and control signals related to the operation of a television broadcast station.

In accordance with the present regulations set by the Federal Communications Commission in the United States, the vertical blanking interval includes approximately 14 horizontal line intervals after the termination of the vertical sync signal and, of these, the last three are allocated for supervisory and test signal use. As described in the aforementioned U.S. patent, however, these same last three intervals are useable in the message system environment there disclosed, as well as in other facsimile communication systems. It would thus be desirable to shift the supervisory test signals to other locations in the vertical blanking interval which would be satisfactory for their use, but less suited for communication purposes.

As will become clear hereinafter, apparatus embodying the present invention generates these supervisory signals in the interval between the beginning of vertical blanking and the beginning of vertical sync. Under current Federal Communications Commission rules, there exist approximately three such horizontal line intervals in this period of time.

The novel features which are considered to be characteristic of the present invention are set forth with particularity in the appended claims. The invention itself, however, both as to its organization and method of operation, and as to the advantages thereof, will best be understood by reference to the accompanying drawings in which:

Figure 1:
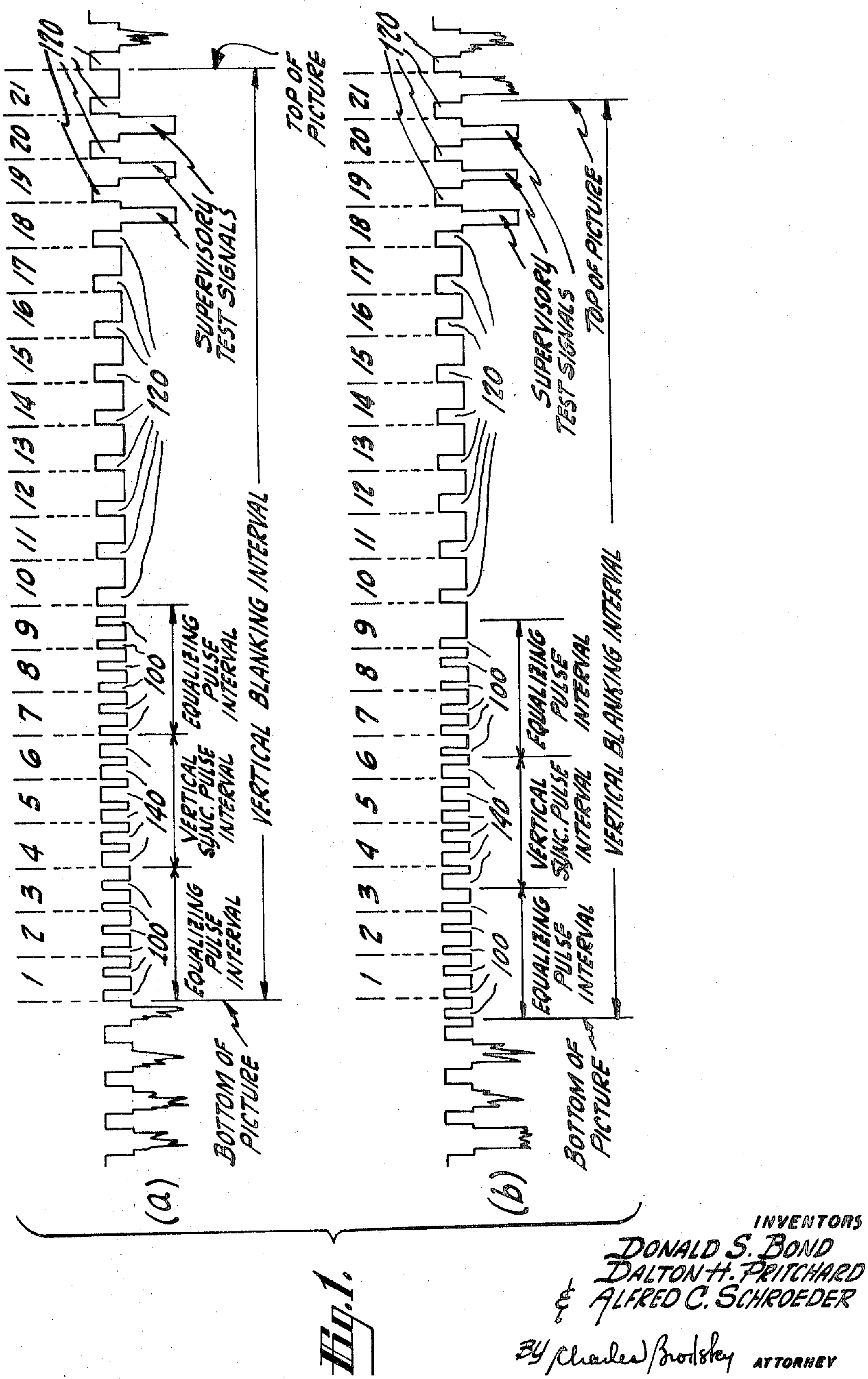
FIGS. 1A and 1B are illustrative television synchronization waveforms showing supervisory test signals as presently employed.

Referring now to FIG. 1, the waveforms A and B respectively illustrate (though not necessarily to scale) the vertical blanking interval for the even and odd fields of an interlaced television signal. As is well known, each of these intervals includes equalizing pulses 100, horizontal sync pulses 120 and serrated vertical sync pulses 140. The equalizing pulses 100 function to maintain vertical synchronization of a television receiver even though two interlaced scanning fields are utilized, while the horizontal sync pulses 120 maintain horizontal synchronization of the receiver during the latter portion of each of the vertical blanking intervals. The serrated vertical sync pulses 140 maintain horizontal synchronization of the receiver during the vertical sync pulse period.

The composite synchronizing signal depicted in waveforms A and B is also used to synchronize the horizontal deflection in the thin window cathode ray tube of the above-described television message system receiver. When used in such an environment, the composite synchronizing signal additionally includes auxiliary video message signals located, for example, in that space in the vertical blanking interval indicated in waveforms A and B by the numeral "16." Message identifying category code signals might further be included in that space denoted "14" for example, as described in U.S. Pat. No. 3,493,674.

Waveforms A and B additionally illustrate the location in the vertical blanking interval of the supervisory or test signals useful to television networks, common carriers transmitting programs from city to city, and television broadcasting stations. Although shown as incorporating pulses in spaces 18 and 19, it will be understood that test signals in these spaces may alternatively incorporate components such as square waves, stair-steps with color carrier superimposed, and sequences of sine waves of selected frequencies known as "-multiburst." Test signals in space 20 appear less frequently, since that space is presently held in reserve as a cue channel where only occasional brief transmissions are required. It has been found that with insertion in the horizontal line spaces beginning with the last 12 microseconds of space 17 and continuing through line 20 of the vertical blanking interval of each field, supervisory signals can be transmitted without undesirably interferring with the reception and reproduction of television pictures.

Figure 2:
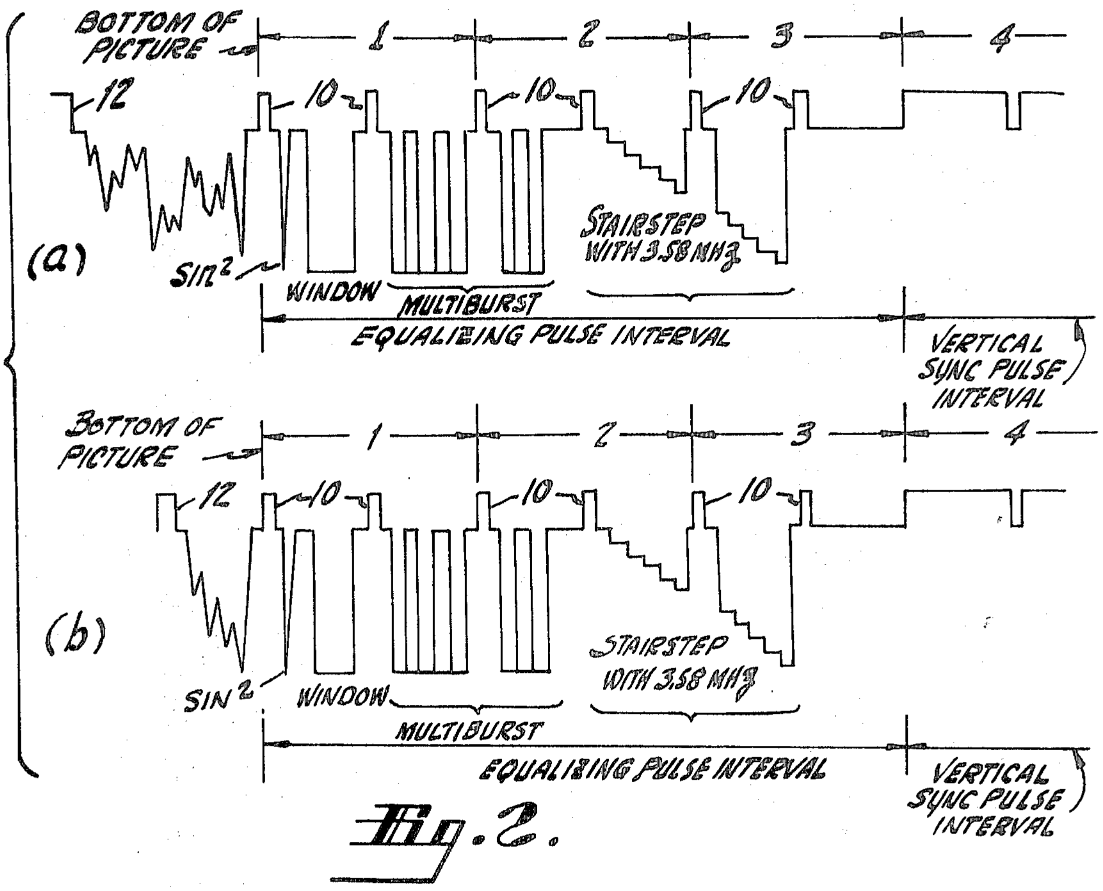
FIGS. 2A and 2B are portions of a television synchronization waveform generated according to the invention.

In order to make these spaces 17—20 available for other types of communication transmission, the apparatus of the present invention operates to relocate the supervisory test signals in the horizontal line spaces following the beginning of vertical blanking and before the beginning of vertical sync. FIG. 2 shows the position of these signals in that portion of the synchronization waveform including such time interval. Waveforms A and B therein illustrate the generation of the test signals in spaces 1—3 of the vertical blanking interval for the even and odd alternate television fields. This region includes the equalizing pulses 10, which have a repetition rate double that of the horizontal sync pulses 12 so as to facilitate interlace of the odd and even fields shown in waveforms A and of FIG. 2.

It will be noted from the waveforms of FIG. 2 that the supervisory test signals occupy three spaces in the vertical blanking interval, are of identical format for each television field and, though not shown, will be understood to be continuously repetitive. This is to be contrasted with current test signal practice where only two spaces are occupied and the format is changed every television field—multiburst and sine-squared signals and window are respectively generated in spaces 18 and 19 on one television field, then multiburst and stairstep signals are generated within those same intervals on the next television field, then a reversal occurs, etc. It will also be seen that the test signals precede the vertical sync pulse by the same amount on both fields, i.e., the position of the test signals is measured with respect to the start of vertical sync and not with respect to the start of horizontal sync. Both these characteristics result in a displacement of the supervisory signals by one-half a horizontal line between odd and even fields and have a minimum effect on interlace operation.

(It will be appreciated that the alteration of the test signal format every television field does not affect interlace in current practice since, by virtue of the test signals appearing after the vertical sync interval has ended—in spaces 18 and 19—the system has almost on entire frame period in which to smooth out the resulting perturbations. Such time is not available, however, when the same test signals are inserted in spaces 1—3, before the vertical sync period, and results in a wave that would undesirably displace the beginning of vertical retrace in a home receiver).

It will additionally be noted that the portion of the synchronizing waveform which contains the test signal components that can pass through the sync separator of the receiver are located as far ahead of the occurrence of vertical sync as possible. This is an important feature in those instances where the peaking circuits of the receiver increase the relative amplitude of the test signals beyond the black level of the synchronizing waveform and toward the sync peak level. Were it not for the placement of the test signals in spaces 1—3 as herein described, it would be possible for the signals to pass through the receiver's sync separator in such instances if their modulation were high, and contribute an undesired output component from the vertical integrator of a magnitude greater than that due to the horizontal sync pulses. Were that the case, the beginning of vertical retrace in the receiver would also be undesirably displaced. It will be seen that such effect can similarly be minimized by reducing the modulation depth toward black polarity of the included supervisory test signals.

Figure 3:
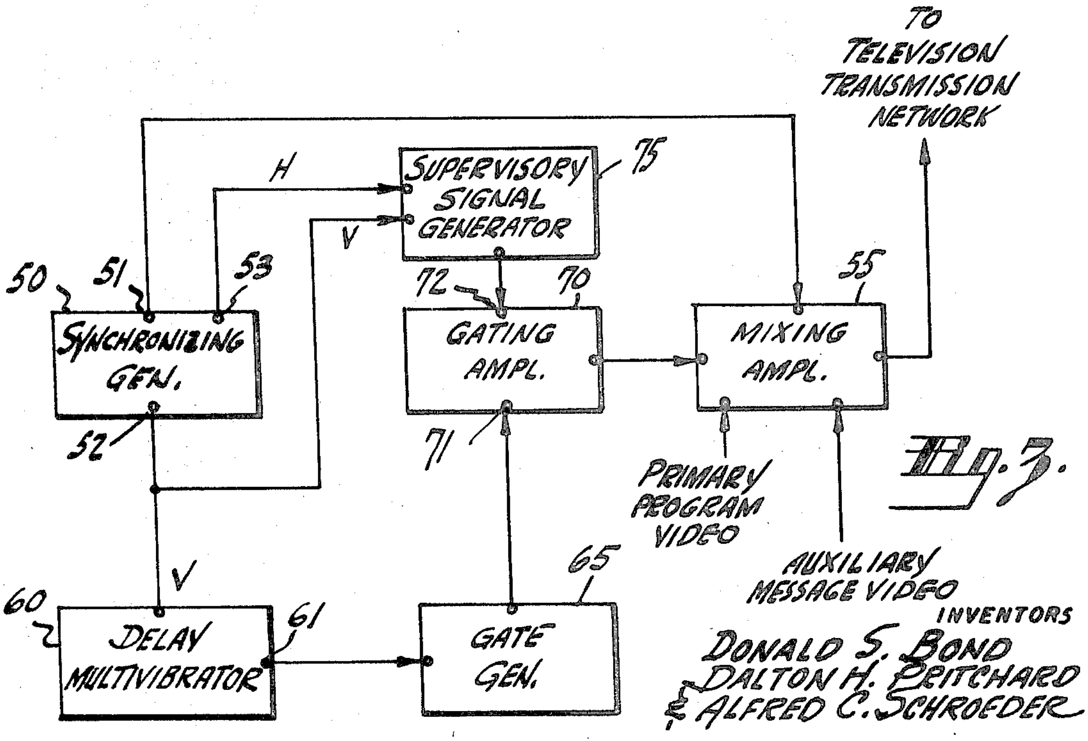
FIG. 3 is a block diagram of apparatus embodying the invention.

In FIG. 3 there is shown a block diagram of apparatus for generating the test signals for insertion into the time interval between the beginning of vertical blanking and the beginning of vertical sync. A synchronizing generator 50 of appropriate construction is included to supply horizontal and vertical driving signals, blanking pulses, and a combined horizontal and vertical synchronizing signal. The repetition rate, waveform, wave duration and timing of these signals are therein accurately controlled, with the output waveform generated being of the type illustrated in FIG. 1, but without the supervisory test signals there shown. The generator 50 is coupled via an output terminal 51 to an included mixing amplifier 55, where the primary program and auxiliary message video signals generated in a manner described in the aforementioned U.S. patent are added during the vertical blanking interval of the applied synchronizing waveform.

The synchronizing generator 50 is also coupled by means of an output terminal 52 to a delay or monostable multivibrator 60. In this respect, however, only the vertical sync pulse is applied to the multivibrator 60. The unit 60 is of the type arranged to switch states on the leading edge of vertical sync and to remain in its transient state for a duration approximately equal to 259½horizontal line periods. At the end of this duration, the multivibrator 60 reverts to its steady state, and is configured to produce a trigger pulse at its output terminal 61 at that time. It will be noted that the imparted 259½horizontal line delay is such as to cause the developed trigger pulse to substantially coincide with the leading edge of the equalizing pulse at the start of the first horizontal line interval of the synchronizing waveform for each television field.

The trigger pulse produced at output terminal 61 is coupled to an additionally included gate generator 65, of the type arranged to respond to the leading edge thereof. The generator 65 is further selected to provide an output pulse having a duration substantially equal to 3 horizontal line intervals. As illustrated in FIG. 3, the pulse so generated by the unit 65 is applied to an input terminal 71 of a gating amplifier 70.

Also coupled to the amplifier 70, by way of another input terminal 72, are the supervisory or test signals intended for insertion within the vertical blanking interval. These signals are produced in a waveform generator unit 75, such as items provided by Riker Video Industries (1501-S Video Test Set) or by Telemation (Video Test Generators-Series TMT–100), and are continuously repetitive, being of the same format for both television fields into which they are to be inserted. Proper and correct timing is maintained between the supervisory signals and the other components of the synchronizing waveform by synchronizing the signal generator 75 with the vertical and horizontal sync pulses developed at the output terminals 52 and 53 of the generator unit 50, respectively.

The amplifier 70 is of the type which operates upon the supervisory signals from the generator 75 only when enabled by the pulses developed by the gate generator 65, and to couple those selected signals to the mixing amplifier 55. Since this enabling occurs during the first three horizontal line intervals of both television fields, it follows that the supervisory test signals will only be added to the synchronizing waveform at the unit 55 during those intervals. It will be apparent that the resulting test signal insertion is timed to coincide with those spaces in the vertical blanking interval between the beginning of vertical blanking and the beginning of vertical sync, as desired. It will also be noted that the timing is maintained with respect to the beginning of vertical sync (which triggers the multivibrator 60) rather than with respect to the beginning of vertical blanking. The composite signal output from the amplifier 55 is, as shown, coupled to a television transmission network for distribution to the home viewer in a conventional manner.

Since, as discussed in U.S. Pat. No. 3,493,674, no auxiliary information is transmitted during the interval between vertical blanking and vertical sync in that message system environment, the insertion of the supervisory test signals into that interval does not upset the operation of the described system. By inserting the test signals in that interval, however, the spaces 17—20 in the synchronizing waveform previously employed for network and studio purposes is freed for use in the message system environment, for the insertion of message information and/or for the insertion of identifying category code signals. In either case, it will be apparent that the result is to expand the usefulness of such an auxiliary communication service.

We claim:

1. In a television transmitting apparatus of the type in which test signals are generated and transmitted during each television field for measuring the performance of broadcast transmissions, the combination comprising:

first means for generating a composite television synchronizing signal including a field scanning rate pulse having a leading edge in fixed time relation with respect to the beginning of the vertical blanking interval thereof on each odd and even television field;

second means for respectively generating substantially identical test signals for each odd and even television field during which said test signals are transmitted; and third means coupled to said first and second means and responsive to the leading edge of said field scanning rate pulse on each television field for generating a gating signal substantially in time synchronism with the intervening interval between the beginning of said vertical blanking interval and the leading edge of said field scanning rate pulse on each television field and for repeatedly multiplexing said identical test signals with said composite signal during each of said intervening intervals in a manner to prevent the loss of synchronization at a television receiver, adjusted to receive said composite television signals, due to the addition of said test signals in said interval 2. The combination as defined in claim 1 wherein said second means generates substantially identical test signals on each television field, and wherein components of test signals capable of passing through a sync separator of a receiver adjusted to receive said composite signals have their modulation depth reduced to minimize their affect on the vertical synchronization of said receiver.

3. The combination as defined in claim 2 wherein said third means multiplexes said test signals with said composite signal in a manner to cause said test signals to precede the leading edge of said field scanning rate pulse by substantially the same amount on each television field.

4. The combination as defined in claim 3 wherein said third means multiplexes said test signals with said composite signal in a manner to position said test signals as far ahead of the leading edge of said field scanning rate pulse as possible.

5. The combination as defined in claim 3 wherein said second means generates test signals having frequency components of the order of the frequency components of said synchronizing signal and wherein said third means multiplexes said test signals with said composite signal in a manner to position said test signals as far ahead of the leading edge of said field scanning rate pulse as possible.

6. The combination as defined in claim 4 wherein said first means includes synchronizing generator means for supplying line and field scanning rate pulses, wherein said second means includes waveform generator means coupled to receive said line and field scanning rate pulses so as to be locked in phase to said synchronizing generator means, and wherein said third means includes:

a. mixing amplifier means arranged to receive said composite television synchronizing signal from said first means; and b. gated amplifier means responsive to the leading edge of said field scanning rate pulse for coupling said test signals from said second means to said mixing amplifier means during the interval between the beginning of said vertical blanking interval and the leading edge of said field scanning rate pulse.